G. S. BAKER.
CONVEYER OR ELEVATOR MORE PARTICULARLY FOR USE IN PROVING DOUGH.
APPLICATION FILED JAN. 6, 1913.
1,194,932.
Patented Aug. 15, 1916.
3 SHEETS—SHEET 1.
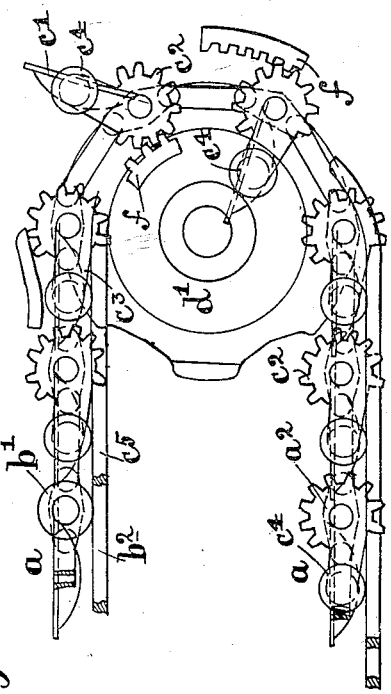
Fig. 1.
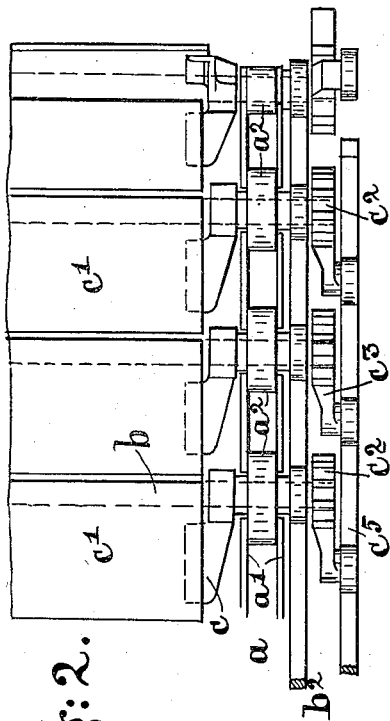
Fig. 2.
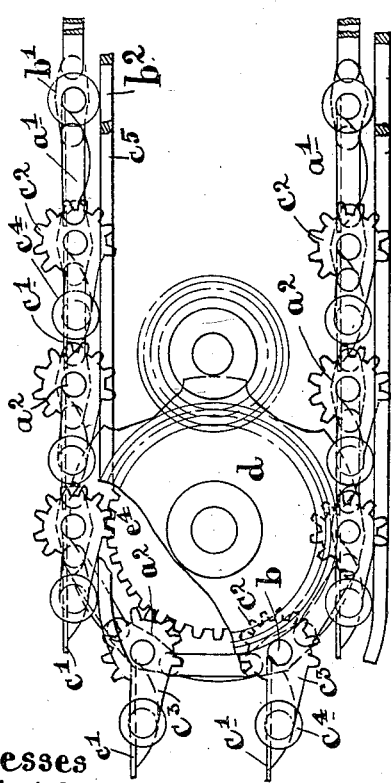
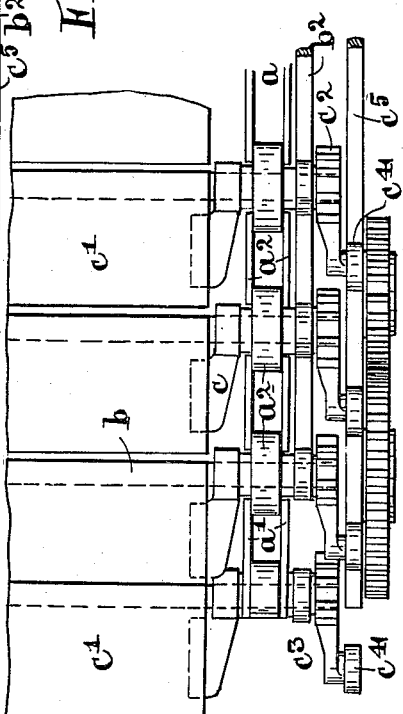
Witnesses
C. A. Waller
L. G. Anger
Inventor
George Samuel Baker
by R. Huddan
Attorney

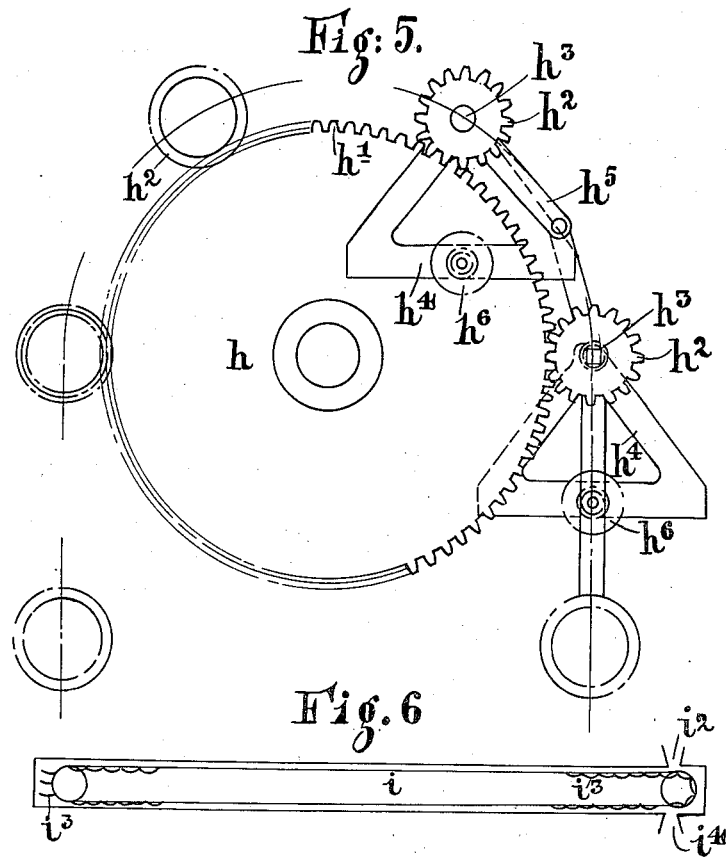
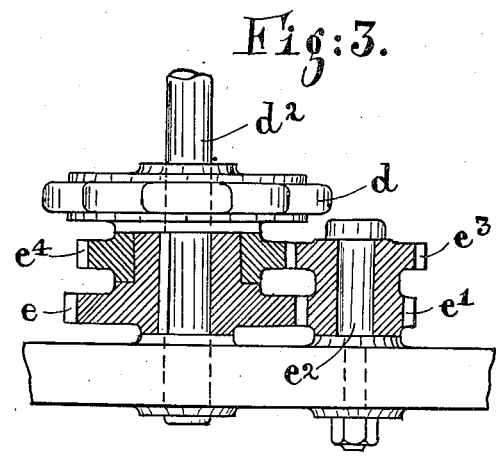

G. S. BAKER.
CONVEYER OR ELEVATOR MORE PARTICULARLY FOR USE IN PROVING DOUGH.
APPLICATION FILED JAN. 6, 1913.

1,194,932.

Patented Aug. 15, 1916.
3 SHEETS—SHEET 3.

Witnesses
C. A. Waller
L. Y. Anger

Inventor
George Samuel Baker
by R. Haddan
Attorney

UNITED STATES PATENT OFFICE.

GEORGE SAMUEL BAKER, OF LONDON, ENGLAND.

CONVEYER OR ELEVATOR MORE PARTICULARLY FOR USE IN PROVING DOUGH.

1,194,932. Specification of Letters Patent. Patented Aug. 15, 1916.

Application filed January 6, 1913. Serial No. 740,405.

*To all whom it may concern:*

Be it known that I, GEORGE SAMUEL BAKER, a subject of the King of England, residing at London, in England, have invented certain new and useful Improvements in Conveyers or Elevators More Particularly for Use in Proving Dough, of which the following is a specification.

This invention relates to conveyers or elevators of that class which comprises a chain, cable or inter-connected series of members passing about rotary guiding or driving elements and carrying one or more supports or carriers for the goods to be conveyed and the invention primarily consists in positively acting gearing whereby the supporting surfaces of said carriers are maintained in a horizontal plane when traveling in curved paths such as around said guiding or driving elements, and whereby the said carriers may be positively actuated to discharge the goods therefrom.

The invention further comprises the features of construction and combinations of parts of such a conveyer, all as will be hereinafter described and specifically pointed out in the appended claims.

The invention is more particularly intended for use in a "dough prover" in which the conveyer comprises or includes a large number of supports for pieces of dough, said supports being mounted upon a continuous chain or equivalent moving in a chamber, the air of which is of a suitable temperature and degree of humidity to "prove" the dough before the same is passed into the oven for baking, but it will be obvious that the invention is equally applicable to any form of conveyer of the character above indicated.

Embodiments of the invention are illustrated in the accompanying drawings in which:—

Figure 7:
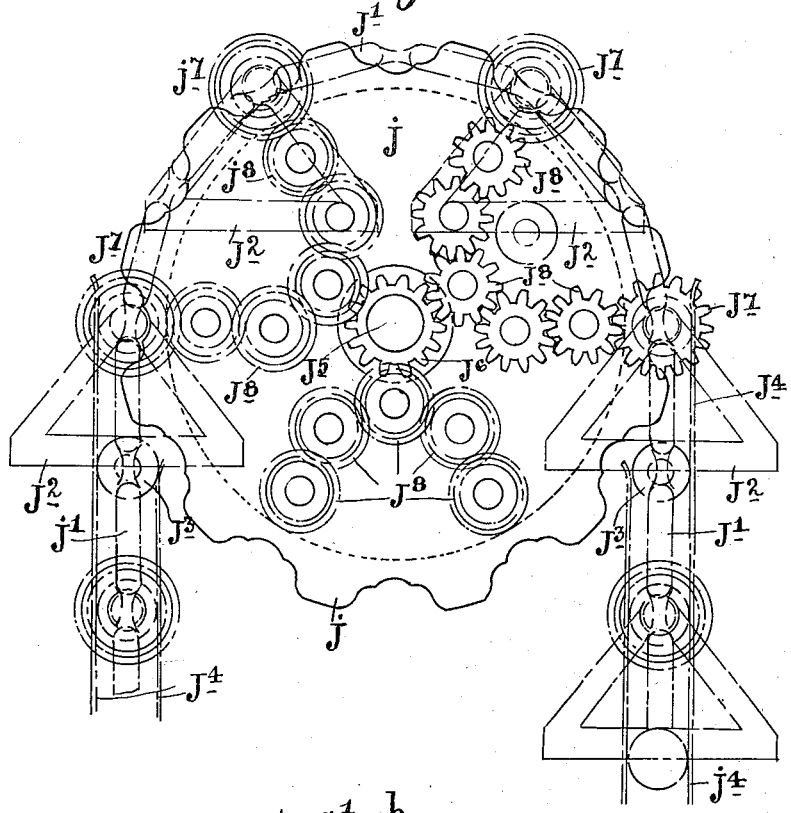
Figure 4:
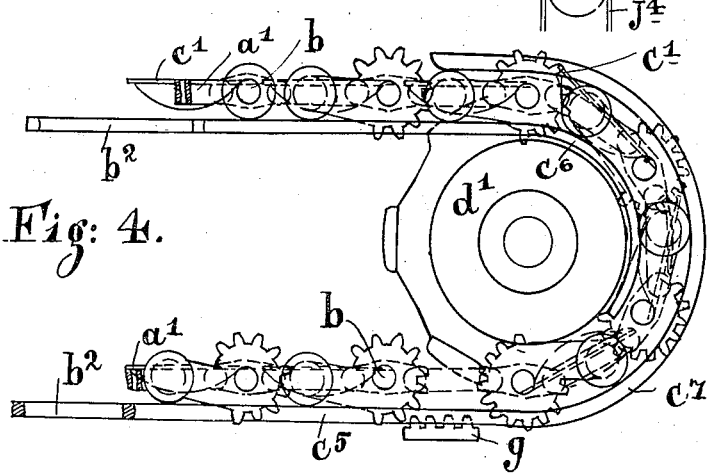

Figure 1 is a side elevation with parts broken away, of an improved conveyer of the horizontal type; Fig. 2 is a partial plan view thereof. Fig. 3 is a sectional detail view of gearing used with the conveyer shown in Figs. 1 and 2. Fig. 4 is a partial side elevation of a conveyer showing modified means for discharging the contents from the supports; Fig. 5 is a partial side-elevation of a portion of a conveyer of the vertical type and Fig. 6 is a diagram showing an arrangement of a single conveyer, and Fig. 7 is a side elevation of a modified form of conveyer of the vertical type.

Referring more particularly to Figs. 1 to 3, the conveyer comprises a pair of endless chains $a$ one at each side comprising open links $a^1$ and solid links $a^2$. Alternating and passing loosely through said latter links is a shaft $b$ on which is mounted a roller $b^1$ adapted to run on a stationary supporting track $b^2$. Also mounted rigidly on said shaft $b$ toward the center of the conveyer is an arm $c$ which carries or is attached to the carrier or plate $c^1$ for supporting the goods and at the outer end of the shaft there is keyed the toothed segment or part pinion $c^2$ having integral therewith an arm or extension $c^3$ on which is loosely mounted a roller $c^4$ adapted to run on a guiding track $c^5$ extending parallel to and in the same plane as the track $b^2$. The chain at each end passes about a sprocket wheel $d\ d^1$, the former of which may be driven from any suitable source of power through the shaft $d^2$, and as shown at the left hand end of Figs. 1 and 2, and in Fig. 3 there is provided in connection with such chain wheel and shaft, a speed increasing gearing comprising the spur wheel $e$ keyed to said shaft and meshing with one set of teeth $e^1$ on a double pinion mounted on a counter shaft $e^2$, the other set of teeth $e^3$ of which mesh with a spur wheel $e^4$ revolving on a boss of the wheel $e$. With said toothed wheel $e^4$ the segments $c^2$ of the carriers are adapted to mesh as the chain passes over the sprocket wheel, the gearing being so calculated that as the conveyer travels around said wheel the carriers are positively compelled by the intermeshing of said segments and toothed wheel to always assume and be maintained in a horizontal position as indicated at the left hand side of Fig. 1, this position being maintained when the carriers are traveling on the straight runs of the conveyer by the rollers $c^4$ engaging the supporting tracks $b^2$ of which as shown there is one for the upper and one for the lower run, which is also the case for the supporting tracks $b^2$. At the other end of the conveyer where it is desired to discharge the material from the carriers, there is provided outside the radius of travel of the conveyer, a stationary curved toothed quadrant $f$ with which the segments $c^2$ engage in turn, in such a manner that as the conveyer travels around the sprocket wheel $d^1$ of the shaft $b$ each carrier is rocked to tilt said carrier sufficiently to discharge the contents thereof into a receptacle or other device located to receive same, and in order to return the carrier to normal position after such tilting there is provided within the radius of travel of the conveyer a fixed curved toothed segment $f^1$ with which again the segments $c^2$ engage. The conveyer is constructed, supported and guided at the opposite side in a similar manner to that described.

In the modification shown in Fig. 4, I use somewhat different means for discharging the contents of the carriers, these means comprising a straight rack $g$ with which the segments $c^2$ engage to completely reverse the carrier and effect the discharge, the return to normal position being produced by curved extension $c^6$ and $c^7$ of the upper and lower guiding tracks $c^5$ respectively, the action involved being clearly illustrated in this figure.

Fig. 5 shows a structure for a vertical conveyer, a portion thereof being shown as passing around the upper driving or guiding wheel $h$ which is provided around its entire periphery with teeth $h^1$ with which meshes a pinion $h^2$ mounted on a shaft $h^3$ from which is suspended a triangular carrier $h^4$, the carriers being connected together by links $h^5$ in the form of an endless chain and each carrier being provided if required with a roller $h^6$ for engaging stationary guides (not shown).

The guiding wheel $h$ is driven by a speed increasing gearing (not shown) similar to that shown in Fig. 3, the speed being so proportioned as to always positively maintain the carriers in a horizontal plane when passing around the wheel $h$.

It will be clearly apparent that if the toothed wheel $h$ is driven at the proper speed (as by the gearing previously described with reference to Fig. 3) in relation to the ratio of the gearing or transmission between said wheel $h$ and any of the gears $h^2$ of the carriers, the latter will always be positively supported in a horizontal position.

Fig. 6 shows in diagram a conveyer $i$ with upper and lower runs arranged within a chamber $i^1$, the character $i^2$ designating the place at which the material is fed onto the carriers $i^3$ and $i^4$ denoting the point of discharge.

Fig. 7 shows a modified construction of vertical conveyer in which a portion thereof is shown as passing around the upper driving or guiding wheel $j$ which is in the form of a sprocket wheel loosely mounted on a shaft $j^5$, and engaged by the links of the chain $j'$ supporting the triangular carriers $j^2$ which are guided on the straight runs of the conveyer by rollers $j^3$ engaging rails or equivalents $j^4$. On the shaft $j^5$ of the wheel $j$ is rigidly mounted a pinion $j^6$ and on the chain adjacent each carrier $j^2$ is a pinion $j^7$ rigid with said carrier, the two pinions $j^6$ and $j^7$ being of the same diameter and toothing or pitch. Between each pinion $j^7$ and the central pinion $j^6$ is a train of wheels $j^8$, these wheels being merely idlers loosely mounted on spindles on the sprocket wheel $j$ and forming as it were epicyclic gears, the innermost of which rolls on the gear $j^6$ and thus during the movement of the conveyer together with the sprocket wheel $j$ tends to hold the carriers horizontal, the gear $j^7$ making one complete revolution to half a revolution of the sprocket wheel $j$. A single wheel $j^7$ instead of a plurality shown may be used if the carriers are sufficiently far apart not to foul each other.

Mounted on the guiding wheel $j$ between each pinion $j^7$ and the central pinion $j^6$ is a train of wheels $j^8$ or a single wheel may be used if the carriers are sufficiently far apart not to foul each other. The respective gears are so proportioned relative to each other that this construction will produce substantially the same result as the previous constructions described, namely, the carriers will always be positively maintained in a horizontal plane when passing around the wheel $j$.

What I claim as my invention and desire to secure by Letters Patent of the United States is:—

1. In a conveyer or elevator the combination of a guiding element having a flexible member passing about said guiding element, carriers in pivotal connection with said flexible member, engaging gear members having a plurality of teeth thereon arranged at the pivotal connection and having an operable engagement with said guiding element and carriers including means respectively adapted to positively position and maintain said first mentioned carrier in a horizontal plane when said carriers are traveling around the guiding element.

2. In a conveyer or elevator the combination with a rotatable guiding element having a curved surface, of a flexible member passing about said guiding element, carriers in pivotal connection with said flexible members and engaging gear members having a plurality of teeth thereon arranged at the pivotal connection and having an operable engagement with said guiding element and carriers, including means respectively adapted to positively position and maintain said carriers in a horizontal plane when the carriers are traveling around the curved surface of the guiding element.

3. In a conveyer or elevator the combination with an endless conveyer comprising pivotally inter-connected elements, carriers supported by said conveyer member in pivotal relation thereto, a rotary guiding and driving element supporting said conveyer member and about which said member passes, an engaging gear having a plurality of teeth thereon in integral relation with each of said carriers, arranged at the pivotal connection of the carriers, and a toothed member having an operable engagement with said rotary guiding element and in driving relation with the toothed gear of each carrier as the latter travels around the guiding element, thereby maintaining said carrier in a horizontal plane.

In witness whereof I have signed this specification in the presence of two witnesses.

GEORGE SAMUEL BAKER.

Witnesses:
 HERBERT D. JAMISON,
 T. J. WORTH.